United States Patent
Al-Birmani et al.

[19]

[11] Patent Number: 6,079,370
[45] Date of Patent: Jun. 27, 2000

[54] PET CAR SEAT

[75] Inventors: Maad Al-Birmani, Reston, Va.; Yousef N. Al-Humidi, Al-Khobar, Saudi Arabia

[73] Assignee: Cecco, Reston, Va.

[21] Appl. No.: 09/396,430

[22] Filed: Sep. 15, 1999

[51] Int. Cl.$^7$ .................................................. A01K 1/035
[52] U.S. Cl. ............................................................ 119/771
[58] Field of Search .................................... 119/452, 453, 119/496, 497, 502, 512, 769, 770, 771

[56] References Cited

U.S. PATENT DOCUMENTS

| | | | |
|---|---|---|---|
| 4,803,951 | 2/1989 | Davis | 119/19 |
| 5,133,294 | 7/1992 | Reid | 119/96 |
| 5,167,202 | 12/1992 | Bradford et al. | 119/15 |
| 5,479,892 | 1/1996 | Edwards | 119/771 |
| 5,551,373 | 9/1996 | O'Donnell | 119/28.5 |
| 5,785,003 | 7/1998 | Jacobson et al. | 119/496 |

*Primary Examiner*—Thomas Price
*Attorney, Agent, or Firm*—Whitham, Curtis & Whitman

[57] ABSTRACT

A pet car seat includes a base, a back separable from and connectable to the base, two posts separable from and connectable to spaced apart openings in a front edge of the base, and a net that connects to one side of the back, wraps around the posts, and connects to another side of the back. The net is removably connected to the sides of the back. The pet car seat is placed on a passenger seat in an automobile and the automobile's seat belt is passed through openings in handles extending behind the back thus securing the pet car seat in the passenger seat. A pet is confined to the base of the pet car seat by the net but not restricted from movement within the base. An additional measure of protection is obtained from a harness about the pet and removably fastened to a connector positioned on a front side of the back, the harness having reflective portions.

7 Claims, 4 Drawing Sheets

PET CAR SEAT

BACKGROUND OF THE INVENTION

1. Field of the Invention

The present invention is generally related to a safety seat for pets removably mounted in an automobile passenger seat.

2. Description of the Prior Art

In today's society, pets are highly regarded and loved by their owner(s) such that a strong bond is often formed between the owner(s) and their pets. Due to this bond, pet owners sometimes travel with their pets and want to protect their pets from harm. A majority of such travel occurs in automobiles. Many times while transporting a pet in an automobile, the pet will wander inside the vehicle and in some instances may create a dangerous situation by restricting or obstructing the driver's movement or vision. This impairs the driver's ability to safely operate the vehicle. Furthermore, in many instances, when left unrestrained the pet sheds its hair about the car and chews or slobbers on the automobile's upholstery. Pets also harm the interior of an automobile when they perform bodily functions therein. In addition, pets often find the interior of an automobile to be uncomfortable.

Therefore, various pet safety and restraining devices have been developed to protect the interior of an automobile from a pet, to restrain and protect a pet in an automobile from harm during normal driving conditions, harsh maneuvers, and during an accident, and to increase the comfort of a pet being transported in an automobile. Naturally, the need for such pet safety and restraining devices does not exist when an automobile is operated without a pet on board. For maximizing the human passenger capacity of a vehicle, the owner of an automobile may, at times, wish to store a pet safety device while not in use. Therefore, it is desirable that a pet safety or restraining device be collapsible.

Heretofore, most automotive pet safety restraint devices have used harnesses and/or tethers to either connect the pet to a seatbelt or to some other part of the automobile. Other safety devices have used nets or the like to surround pets and confine them to a specific area. Still other pet safety devices use a specially designed car seat and tether the pet thereto. However, heretofore no one has contemplated a pet safety seat that protects a pet in an automobile and protects an automobile interior from a pet with a restraining net wrapped around removable posts spaced apart at a front edge of a base with a removable, washable pad, the safety seat being secured in the automobile's passenger seat by the automobile's seat belt.

SUMMARY OF THE INVENTION

It is therefore an object of the present invention to provide a pet car seat that is removably mountable in the passenger seat of an automobile.

A related object of the present invention is to provide a pet car seat that is collapsible for compact storage.

Another object of the present invention is to provide a pet car seat which confines a pet to a limited area.

Another related object of the present invention is to restrain a pet from being tossed about an automobile interior during an accident or sudden maneuver of the automobile.

A similar object of the present invention is to protect a pet from harm during an accident or other sudden movement of an automobile in which the pet is being transported.

A like object of the present invention is to protect the interior of an automobile from damage caused by pet hair, excrement, or saliva.

A comparable object of the present invention is to protect the interior of an automobile from damage caused by the chewing, clawing, digging, tearing, or otherwise destructive behavior of a pet being transported in the automobile.

Another object of the present invention is to increase the comfort of a pet being transported in an automobile.

A further object of the present invention is to insure that a driver's movement remains unobstructed while operating an automobile in which a pet is being transported.

A still further object of the present invention is to insure that a driver's vision is unobscured while operating an automobile in which a pet is being transported.

In order to accomplish these and other objects of the invention, a pet car seat is described including a base, a back member that is separable from and connectable to the base, two post members that are separable from and connectable to spaced apart openings in a front edge of the base, and a net that connects to one side of the back member, wraps around the posts, and connects to another side of the back member. During use, an assembled pet car seat is placed on a passenger seat in an automobile and the automobile's seat belt is passed through slots in the back member of the pet car seat thus securing the pet car seat in the automobile passenger seat. A pet is then placed in the base and confined by the net, thus unable to roam about the car and restrained from being tossed about the automobile interior should and accident or sudden maneuver occur. Further, the pet's head is not restricted from moving about nor is the pet's view obstructed such that the animal does not experience an overwhelming feeling of confinement.

If further protection is desired, a harness or leash about the pet may be fastened to a connector positioned on a front side of the back member. For the sake of convenience and improved safety, the harness or leash is provided with reflective portions. Thus, the pet may be conveniently removed from the pet car seat and walked while properly restrained by the leash or harness. Furthermore, if the pet is removed from the automobile and walked at night, the reflective portions on the harness provide an additional safety factor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
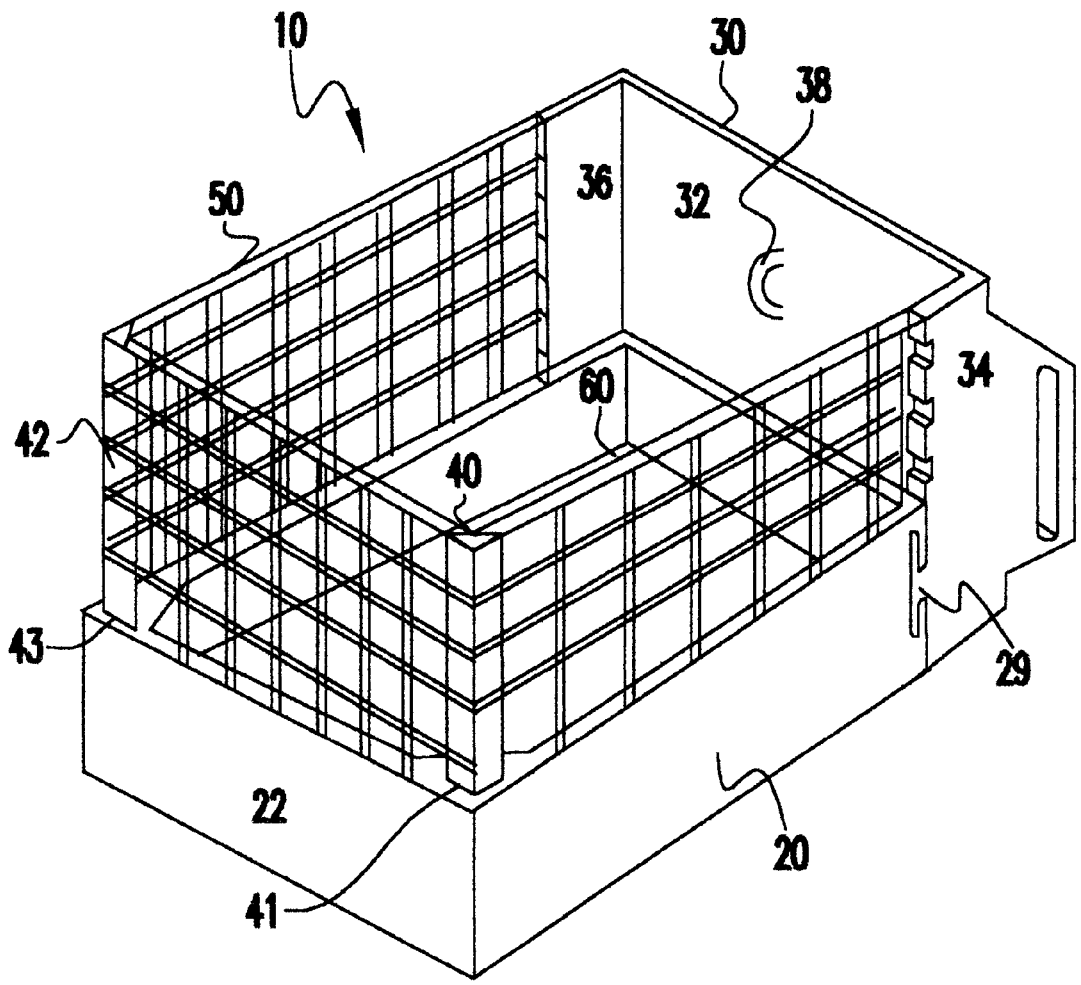
FIG. 1 is a perspective view of an assembled knock-down pet car seat according to the present invention.

Referring now to the drawings, and more particularly to FIG. 1, there is shown a pet car seat 10 having a base 20, a back 30, a first post 40, a second post 42, and a net 50. The base 20 has a front edge 22. Similarly, the back 30 has a front side 32. The first post 40 is connected to a first opening 41 in the base 20, and the second post 42 is connected to a second opening 43 in the base 20. The openings 41, 43 are spaced apart in the front edge 22 of the base 20.

The net 50 is connected to a first side 34 of the back 30 and to a second side 36 opposite the first side 34. The net 50 extends from the first side 34, around the first post 40, to and around the second post 42, and then to the second side 36. A harness connector 38 is attached to the front side 32 of the back 30, and a pad 60 rests in the base 20.

The primary purpose of the net 50 is to confine a pet to the pad 60 in the base 20. Therefore, it is recommended that the net 50 be approximately the height of the posts 40 and 42. Also, it is recommended that the pad be fabricated from a disposable or washable material so that the area in which the pet is confined can be cleansed from excrement.

Figure 2:
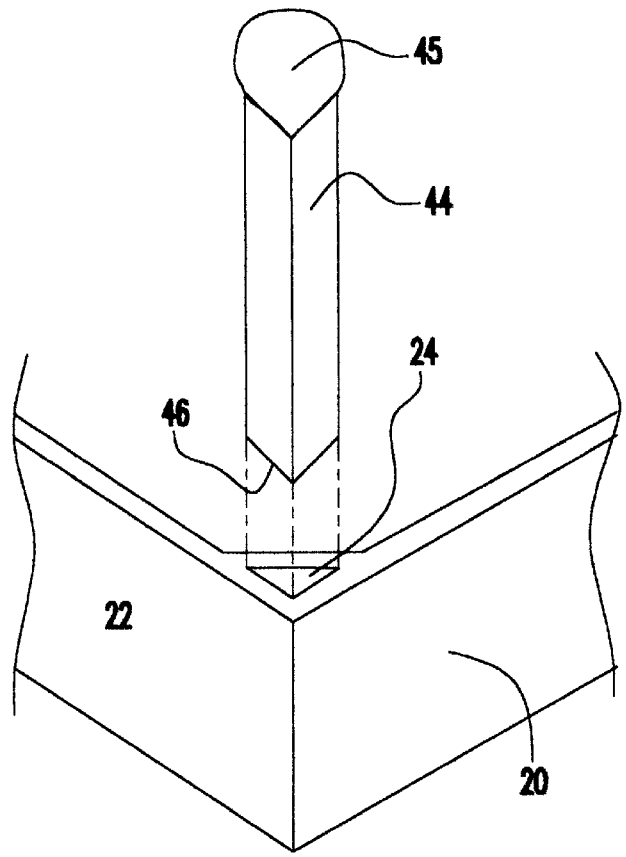
FIG. 2 is a fragmented, exploded perspective view of a front left corner and an alternative post member of a knock-down pet car seat according to the present invention.
Figure 3:
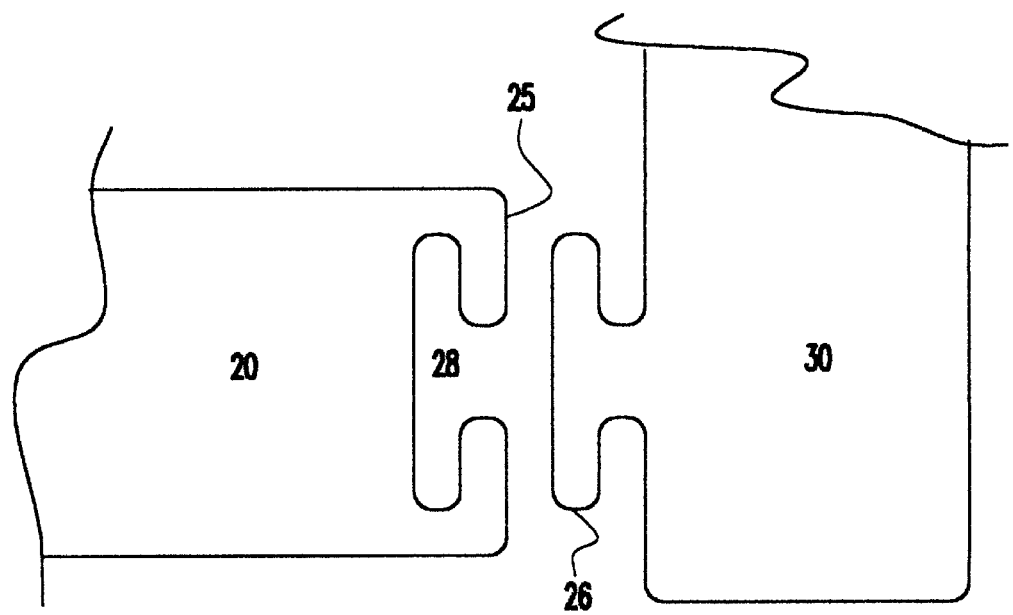
FIG. 3 is a fragmented side view showing a means of connecting a base and a back member of a knock-down pet car seat according to the present invention.
Figure 4:
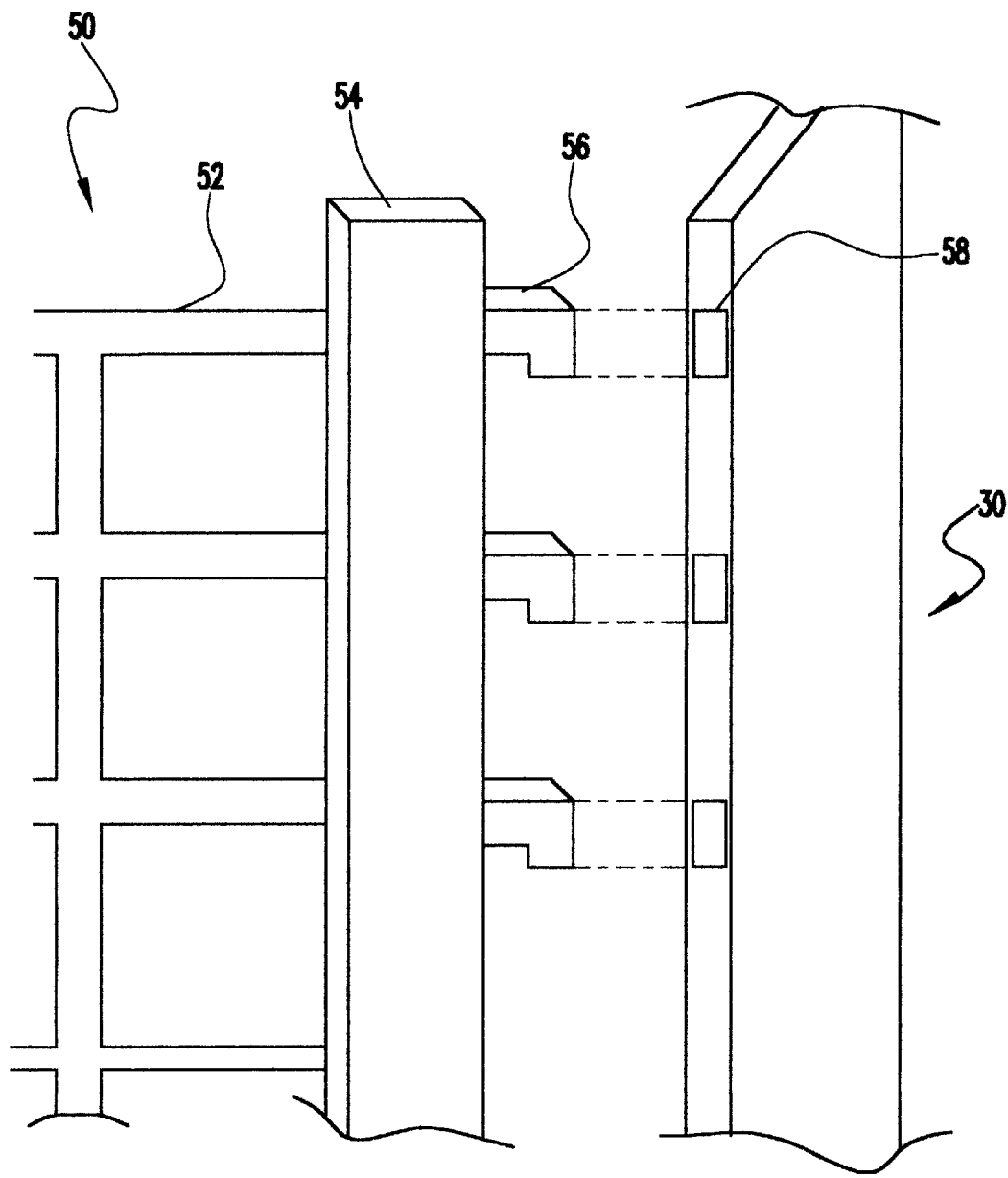
FIG. 4 is a fragmented, exploded perspective view showing a means of connecting a net and a side of a back member of a knock-down pet car seat according to the present invention.

The pet car seat 10 is shown assembled in FIG. 1. FIGS. 2 to 4 show how to assemble the pet car seat 10. Referring to FIG. 2, a post 44 is shown above the base 20. The post 44 has an enlarged upper end 45. The enlarged upper end 45 helps secure the net 50 in place when the pet car seat 10 is assembled.

To attach the post 44 to the base 20 during assembly of the pet car seat 10, a lower end 46 of the post 44 is inserted into opening 24. The lower end 46 and the opening 24 are sized so that the post 44 will be snugly connected to the base 20 by friction once the lower end 46 is inserted into the opening 24. To disassemble the pet car seat 10, the post 44 is pulled out of the opening 24. A second post is similarly connected to and separable from another opening spaced apart in the front edge 22 of the base 20.

Referring to FIG. 3, the base 20 and the back 30 are shown from the side to illustrate that the back 30 is separable from and connectable to the base 20 at a back edge 25 of the base 20. In the preferred embodiment shown, a male strip 26, extending outwardly from the back 30, slides into a female slot 28 defined by the back edge 25 of the base 20. The resulting mating connection 29 is shown in perspective in FIG. 1. The means by which the back 30 is separably connected to the back edge 25 of the base 20 is unimportant to the present invention. However, in order to reduce the space required to store the pet car seat, and in order to achieve the portability desired for the pet car seat of the present invention, it is necessary that the pet car seat be designed so that the back and the base can be disassembled.

In order to fully disassemble the pet car seat 10, it is also necessary that the net 50 be separable from and connectable to the back 30. Referring now to FIG. 4, a preferred embodiment of the connection between the net 50 and the back 30 is shown. In this preferred embodiment, netting 52 and a plurality of hooks 56 extend from opposing sides of a support strip 54. The hooks 56 fit into slots 58 defined by the back 30. More particularly, referring again to FIG. 1, the slots 58 shown in FIG. 4, are defined by the first side 34 and also by the second side 36 of the back 30. When the hooks 56 are fitted within the slots 58, the net 50 is securely connected to the back 30. As with the connection between the back 30 and the base 20, the means by which the net 50 is separably connected to the back 30 is unimportant to the present invention. For example, snaps or hook and loop fasteners may also be used to provide a separable connection between the net 50 and the back 30.

Figure 5:
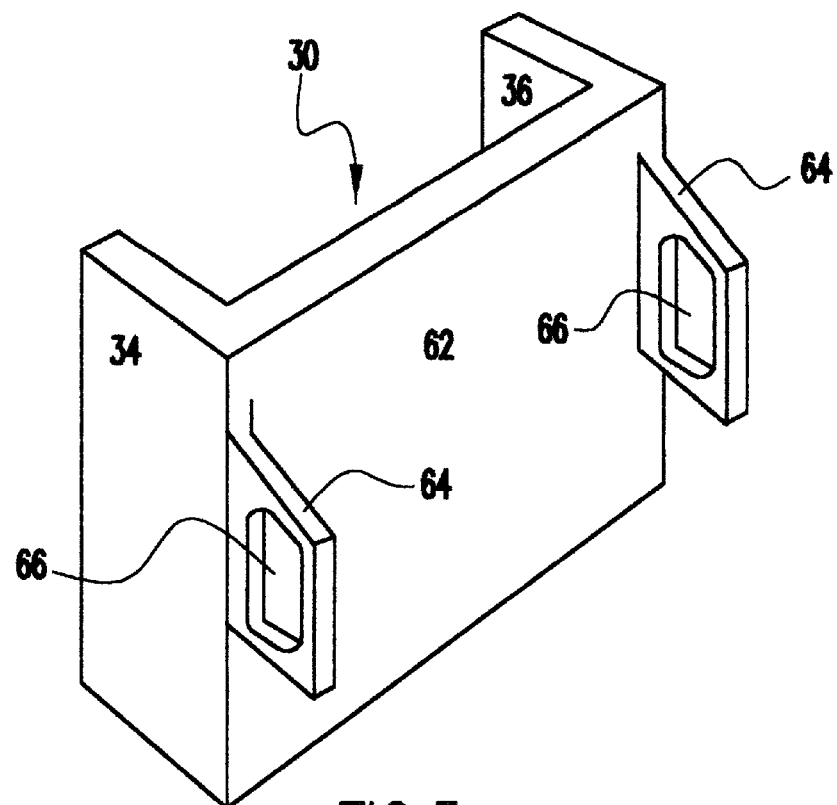
FIG. 5 is a perspective view of a seat belt retaining mechanism on a back surface of a back member of a knock-down pet car seat according to the present invention.

When the pet car seat 10 is fully assembled, it will be secured in a passenger seat in an automobile by the automobile's seat belt. Referring now to FIG. 5, the back 30 is shown in a perspective view from the rear, thus revealing a back surface 62. A pair of handles 64 extend from opposite sides of the back surface 62. The handles 64 have openings 66 through which the automobile's seat belt may pass to fasten the assembled pet car seat 10 to the passenger seat of the automobile. In this manner, the handles 64 function as the preferred embodiment of a seat belt retaining mechanism. It is not critical to this invention the particular form taken by the seat belt retaining mechanism. But, the back surface 62 of the back 30 should include a mechanism by which the assembled pet car seat 10 can be secured in the passenger seat of an automobile by a seat belt.

Figure 6:
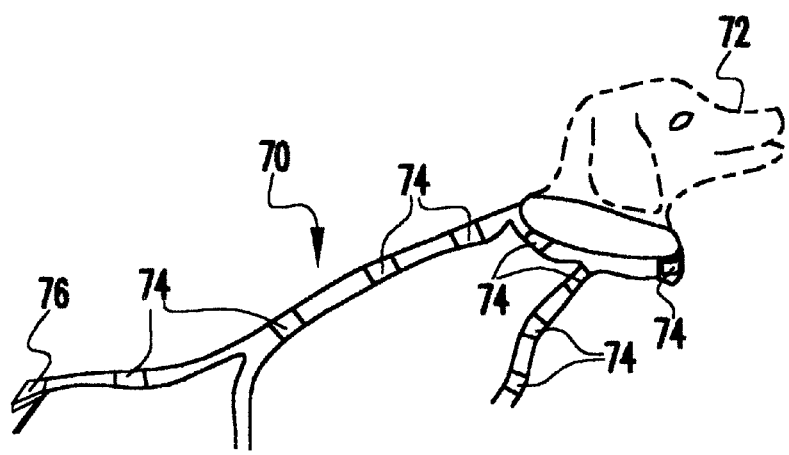
FIG. 6 is a fragmented side view of a pet harness of a knock-down pet car seat according to the present invention.

Referring now to FIG. 6, a pet harness 70 is shown about a pet 72. The pet harness 70 could be a common leash, or a more involved means of retaining a pet. The present invention may be used for a myriad of different kinds of pets. Thus, the pet 72 is shown by phantom lines merely for the purpose of illustrating the harness 70.

The pet harness 70 contains reflective portions 74 and a harness fastener 76. The harness fastener 76 is separable from and connectable to the harness connector 38 shown in FIG. 1. As shown in FIGS. 1 and 6, the harness connector 38 is an eyelet and the harness fastener 76 is a clasp to fasten around the eyelet. The harness fastener 76 and harness connector 38 may also be a hook and loop, a snap, or any other effective means of removably connecting the pet harness 70 to the front side 32 of the back 30.

It is not critical to the present invention that the pet harness 70 be removably connected to the back 30. However, the driver of the automobile may want to make a temporary stop en route to a destination to take the pet 72 for a walk. By designing the pet car seat 10 so that the pet harness 70 is removably connected to the back 30 by a harness connector 38, the pet 72 may be easily removed from the pet car seat 10 for a walk during which the pet 72 will remain adequately restrained by the pet harness 70.

Sometimes the driver may desire to stop to take the pet 72 for a walk at night. Since the driver will temporarily park the automobile to walk the pet 72, it is believed that other vehicles may be in the vicinity during the walk. The reflective portions 74 of the pet harness 70 are thus designed to improve safety to both the pet 72 and a person walking the pet 72 at night.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A knock-down pet car seat suitable for safe transportation of a pet in a vehicle and for convenient disassembly and transportability, comprising:

a base;

a back member separable from and connectable to a back edge of said base, said back member including a seat belt retaining mechanism on a back surface;

two post members separable from and connectable to spaced apart openings formed in a front edge of said base; and a net separable from and connectable to opposing sides of said back member, said net having length which permits it to extend from a first side of said back member, around said two post members, and to a second side of said back member when said back member and said two post members are connected to said base.

2. The knock-down pet car seat of claim 1 wherein said net is connectable to said opposing sides of said back member by hooks located on opposing ends of said net, said hooks fitting within slots on said opposing sides of said back member.

3. The knock-down pet car seat of claim 1 wherein said net has a height dimension when connected to said opposing sides of said back member which is greater than 50% of a height of said post members.

4. The knock-down pet car seat of claim 1 wherein said post members include enlarged upper ends.

5. The knock-down pet car seat of claim 1 further comprising a harness connector positioned on a front side of said back member.

6. The knock-down pet car seat of claim 5 further comprising a pet harness separable from and connectable to said harness connecter.

7. The knock-down pet car seat of claim 6 wherein said pet harness includes reflective portions.

* * * * *